United States Patent [19]

Schmidl et al.

[11] Patent Number: 5,719,134
[45] Date of Patent: Feb. 17, 1998

[54] METHOD OF PROVIDING NUTRITION TO ADOLESCENTS

[75] Inventors: Mary K. Schmidl, Arden Hills; Carol J. Lowry, Minneapolis, both of Minn.

[73] Assignee: Novartis Nutrition AG, Berne, Switzerland

[21] Appl. No.: 715,298

[22] Filed: Sep. 17, 1996

Related U.S. Application Data

[62] Division of Ser. No. 309,815, Sep. 21, 1994.

[51] Int. Cl.$^6$ .............. A61K 31/715; A61K 31/595; A61K 31/495; A61K 31/525; A61K 31/51; A61K 31/44; A61K 31/355; A61K 31/34; A61K 31/235; A61K 31/225; A61K 31/22; A61K 31/23; A61K 31/195; A61K 31/07

[52] U.S. Cl. .............. 514/58; 514/60; 514/168; 514/249; 514/251; 514/276; 514/345; 514/355; 514/458; 514/474; 514/532; 514/547; 514/549; 514/552; 514/561; 514/725

[58] Field of Search ................... 514/2, 561, 565, 514/52, 341, 725, 560, 549, 58, 60, 168, 249, 251, 276, 345, 355, 458, 474, 532, 547, 552

[56] References Cited

U.S. PATENT DOCUMENTS

| | | | |
|---|---|---|---|
| 3,697,287 | 10/1972 | Winitz | 514/561 |
| 3,701,666 | 10/1972 | Winitz . | |
| 3,773,930 | 11/1973 | Mohammed et al. . | |
| 4,368,204 | 1/1983 | Sato et al. | 424/274 |
| 4,871,550 | 10/1989 | Millman | 424/601 |
| 5,026,721 | 6/1991 | Dudrick et al. | 514/396 |
| 5,326,569 | 7/1994 | Acosta et al. . | |
| 5,431,925 | 7/1995 | Ohmori et al. | 424/646 |

FOREIGN PATENT DOCUMENTS

| | | |
|---|---|---|
| 034034 | 8/1981 | European Pat. Off. . |
| 312612 | 4/1989 | European Pat. Off. . |
| 421309 | 9/1990 | European Pat. Off. . |

OTHER PUBLICATIONS

H.Schertz & F. Senser, Wissenschalftliche Verlagsgesellschaft Mgh, pp. 124–126, (1989).
Dubin, et al., J. American Dietic Association, pp. 884–887, vol. 94, No. 8, (Aug. 1994).
Derwent Abstract No. 86–325130 (Apr. 1986).

*Primary Examiner*—Raymond Henley, III
*Attorney, Agent, or Firm*—Gabriel Lopez

[57] ABSTRACT

A dietary composition comprising, based on total caloric content of the composition,
  a) a carbohydrate component which comprises from 50 to 65% of the total caloric content;
  b) a lipid component which comprises from 20 to 35% of the total caloric content; and
  c) an amino acid component which comprises from 10 to 20% of the total caloric content and which comprises specified amino acids and amounts thereof is useful providing nutrition to human adolescents.

14 Claims, No Drawings

METHOD OF PROVIDING NUTRITION TO ADOLESCENTS

This is a division of application Ser. No. 08/309,815 filed Sep. 21, 1994.

SUMMARY OF THE INVENTION

This invention relates to dietary compositions, useful for providing nutrition to a human adolescent for stimulating growth which comprise a) a carbohydrate component which comprises from 50 to 65% of the total caloric content of said composition;

b) a lipid component which comprises from 20 to 35% of the total caloric content of said composition; and c) an amino acid component which comprises from 10 to 20% of the total caloric content of said composition and which comprises 2.3 to 2.8% L-histidine, 6.1 to 7.4% L-soleucine, 8.5 to 10.2% L-leucine, 7.0 to 8.4% L-valine, 6.6 to 8.0% L-lysine, 3.1 to 3.8% L-methionine, 5.5 to 6.6% L-phenylalanine, 4.8 to 5.8% L-threonine, 1.7 to 2.1% L-tryptophan, 5.7 to 6.9% L-alanine, 6.2 to 7.5% L-arginine, 5.9 to 7.1% L-aspartic acid, 2.3 to 2.8% L-cystine, 12.9 to 15.5% L-glutamine, 3.8 to 4.6% L-glutamic acid, 3.2 to 3.9% glycine, 5.0 to 6.0% L-proline, 5.4 to 6.5% L-serine, and 4.0 to 4.8% L-tyrosine, all based on total weight of said amino acid component.

The compositions are useful for administering nutrition to adolescents particularly those ages 1 to 10 years, for diseases or conditions such as inflammatory bowel disease, intractable diarrhea, lactose intolerance, short bowel syndrome, cystic fibrosis, cow's milk protein enteropathy or sensitivity, pre or post surgery, AIDS, malabsorption syndrome, gastroenteritis, GI fistula, and pancreatic disorder.

BACKGROUND OF THE INVENTION

Providing proper nutrition to adolescents is important in growth and development. Nutrition is especially important to adolescents who are undergoing certain conditions or disease, and who are unable to consume food orally and must be fed enterally. Physicians have had to use baby formulas or modify existing adult enteral formulas to meet the needs of their adolescent patients. They have added fats and carbohydrates to increase the calories, lowered the protein content or reduced the water used in preparing powdered or concentrated varieties. These modifications do not provide for a well-balanced formula as the sodium and vitamins and minerals are not appropriate. Some physicians have added iron, vitamins and calcium, but again an appropriately balanced formula was not achieved. Thus, a strong need exists for improved enteral or oral formulas designed for the nutritional needs of adolescents.

Enteral food compositions containing essential amino acids, minerals and carbohydrates are described in U.S. Pat. No. 3,697,287. U.S. Pat. No. 4,368,204 describes elemental nutritional compositions for pediatrics having a specific amino acid profile. However, the compositions of the prior art are not optimal for providing nutrition to human adolescents. These compositions are typically too high in osmolality and relatively low in amount of essential amino acids and other components required for growth.

The present invention overcomes deficiencies of the prior art compositions by providing an improved nutritional composition for adolescents which has an optimal amino acid, carbohydrate and lipid content, as well as a balanced mineral, vitamin and electrolyte content.

DETAILED DESCRIPTION

This invention provides compositions and a method of providing nutrition to human adolescents. The compositions of the invention comprise a) a carbohydrate component which comprises from 50 to 65% of the total caloric content of said composition;

b) a lipid component which comprises from 20 to 35% of the total caloric content of said composition; and c) an amino acid component which comprises from 10 to 20% of the total caloric content of said composition and which comprises 2.3 to 2.8% L-histidine, 6.1 to 7.4% L-isoleucine, 8.5 to 10.2% L-leucine, 7.0 to 8.4% L-valine, 6.6 to 8.0% L-lysine, 3.1 to 3.8% L-methionine, 5.5 to 6.6% L-phenylalanine, 4.8 to 5.8% L-threonine, 1.7 to 2.1% L-tryptophan, 5.7 to 6.9% L-alanine, 6.2 to 7.5% L-arginine, 5.9 to 7.1% L-aspartic acid, 2.3 to 2.8% L-cystine, 12.9 to 15.5% L-glutamine, 3.8 to 4.6% L-glutamic acid, 3.2 to 3.9% glycine, 5.0 to 6.0% L-proline, 5.4 to 6.5% L-serine, and 4.0 to 4.8% L-tyrosine, all based on total weight of said amino acid component.

The carbohydrate component of the composition of this invention comprises 50–65% of the total caloric content of the composition, more preferably from 60 to 65% of the total caloric content; most preferably about 63% of the total caloric content. Any carbohydrate conventionally used in nutritional compositions are useful in the composition of this invention, but preferably the carbohydrate component consist essentially of maltodextrin, modified starch or mixtures thereof. The carbohydrate component provides optional absorption of the carbohydrate by the gastro-intestinal tract of adolescent, particularly for those with malabsorption disorders. The carbohydrate component more preferably consist essentially of about 72–99% by weight maltodextrin and about 1–28% by weight modified starch. The carbohydrate component is preferably free of lactose (which may be a problem in adolescents with lactose intolerance) and preferably contains no sucrose or fructose.

The lipid component for the compositions of this invention comprises from 20 to 35% of the total caloric content of the composition, more preferably 20 to 30%, most preferably about 25%. Adequate lipid intake is important as a source of energy, essential fatty acids and carrier of fat soluble vitamins. Suitable lipids for use in the present invention include, any of the conventional saturated and unsaturated fatty acids, glycerides and other nutritionally acceptable fat sources known in the art, such as animal oils, fish oils, vegetable oils and synthetic lipids. Preferably the lipid component consists essentially of soybean oil, medium chain triglycerides, or mixtures thereof. More preferably, the lipid component consists of about 30% by weight soybean oil and about 70% by weight medium chain, triglycerides, based on total weight of said lipid component. Medium chain triglycerides have been shown to be well-utilized in clinical conditions where standard long chain dietary fats are malabsorbed. In addition, medium chain triglycerides contain fatty acid chains composed of six to ten linear carbon units. These triglycerides do not require emulsification with bile, are more rapidly and more easily hydrolyzed than long chain fats and the fatty acids are directly absorbed into the portal system. Soybean oil is preferred as an excellent source of linoleic and linolenic acids. The composition of the invention comprises about 4.3% of its total energy content as linoleic acid and about 0.6% linolenic acid giving a total of about 4.9% as essential fatty acids.

The lipid component is preferably added or included in the compositions of the invention in the form of dry granules encapsulated by carbohydrate. The encapsulated lipid can be prepared by adding the lipid to an aqueous carbohydrate slurry, homogenizing it, and spray drying it to form the dry granules. The encapsulated lipid provides improved emulsion stability to the compositions of the invention.

The amino acid component of the compositions of this invention comprises from 10 to 20% of the total caloric content of the composition, more preferably 10 to 15%, most preferably about 12%. The amino acid component comprises 2.3 to 2.8% L-histidine, 6.1 to 7.4% L-isoleucine, 8.5 to 10.2% L-leucine, 7.0 to 8.4% L-valine, 6.6 to 8.0% L-lysine, 3.1 to 3.8% L-methionine, 5.5 to 6.6% L-phenylalanine, 4.8 to 5.8% L-threonine, 1.7 to 2.1% L-tryptophan, 5.7 to 6.9% L-alanine, 6.2 to 7.5% L-arginine, 5.9 to 7.1% L-aspartic acid, 2.3 to 2.8% L-cystine, 12.9 to 15.5% L-glutamine, 3.8 to 4.6% L-glutamic acid, 3.2 to 3.9% glycine, 5.0 to 6.0% L-proline, 5.4 to 6.5% L-serine, and 4.0 to 4.8% L-tyrosine, all based on total weight of said amino acid component. More preferably the amino acid component comprises 2.4 to 2.6% L-histidine, 6.6 to 6.8% L-isoleucine, 9.2 to 9.5% L-leucine, 7.6 to 7.8% L-valine, 7.1 to 7.4% L-lysine, 3.3 to 3.5% L-methionine, 6.0 to 6.2% L-phenylalanine, 5.2 to 5.4% L-threonine, 1.8 to 2.0% L-tryptophan, 6.2 to 6.4% L-alanine, 6.7 to 6.9% L-arginine, 6.4 to 6.6% L-aspartic acid, 2.4 to 2.6% L-cystine, 14.0 to 14.5% L-glutamine, 4.1 to 4.3 L-glutamic acid, 3.4 to 3.6% glycine, 5.4 to 4.6% L-proline, 5.8 to 6.1% L-serine, and 4.3 to 4.5% L-tyrosine. Most preferably the amino acid component comprises about 2.5% L-histidine, 6.7% L-isoleucine, 9.4% -leucine, 7.7% L-valine, 7.3% L-lysine, 3.4% L-methionine, 6.1% L-phenylalanine, 5.3% L-threonine, 1.9% L-tryptophan, 6.3% L-alanine, 6.8% L-arginine, 6.5% L-aspartic acid, 2.5% L-cystine, 14.2% L-glutamine, 4.2% L-glutamic acid, 3.5% glycine, 5.5% L-proline, 5.9% L-serine, and 4.4% L-tyrosine.

The compositions of this invention preferably contain 100% free amino acids specially designed to provide a balance of amino acids for adolescents. This balance of amino acids is hypoallergenic in comparison to intact protein used in other formulas. Free amino acids may have a unique benefit in the dietary management of adolescents sensitive to intact protein and for feeding adolescents with severe and persistent diarrhea. The amino acid profile of the present compositions meets or exceeds the standard for high quality proteins established by the National Academy of Science-National Research Council. The preferred non-protein calorie to nitrogen ratio to 200:1 and total calorie to nitrogen ratio of 227:1 will meet the needs of adolescent patients. In general, protein requirements are increased during stress due to increased losses and greater needs for anabolism and tissue repair. Studies have shown the enteral fortification employing sufficient quantities of protein can accelerate the synthesis of visceral protein and promote positive nitrogen balance and host defense factors. However, excessive levels of protein are contra-indicated because of the resulting increase in renal solute load.

The amino acid component preferably comprises 11.2 to 11.5% by weight aromatic amino acid (such as phenlalanine and tyrosine) and 5.4 t 6.5% by weight sulfur-containing amino acids (such as methionine and cystine), based on total weight of the amino acid component. These are believed to be among the most important amino acids for growth in adolescents.

The compositions of the invention preferably contain L-carnitine and taurine. Adequate levels of L-carnitine are essential for lipid metabolism. The compositions preferably contain from about 0.01 to about 0.02% by weight based on total dry weight of the composition L-carnitine. Taurine is important for normal retinal development and in the synthesis of bile salts. Taurine also aids in improved fat absorption, growth and weight gain. The preferred compositions contain about 0.04 to 0.05% by weight taurine based on total dry weight of the composition.

The compositions of the invention can be in the form of a solid powder, this powder is subsequently dissolved or dispersed in juices, water or other aqueous based, non-protein medium. The solid powder form preferably has a caloric content from about 4–5, calories per gram of the composition. The compositions can also be in the form of a ready-to-use aqueous liquid which preferably has a caloric content of about 0.8 calorie per milliliter. The aqueous compositions of the invention preferably have an osmolality of about 300 to 400 mOsm per kilogram of water; more preferably about 350 to 370 mOsm/kg; most preferably about 360 mOsm/kg. Likewise, 0.22 grams of the dry powder composition in 1 gram of water has an osmolality of 300 to 400 mOsm.

Preferred compositions of the invention have the following formulation, based on total dry weight of the composition:

| Ingredient | % by weight |
| --- | --- |
| Maltodextrin | 42.5960 to 52.0618 |
| Modified starch | 16.3556 to 19.9901 |
| Medium chain triglycerides | 7.5770 to 9.2608 |
| Soybean oil | 3.2834 to 4.0130 |
| Calcium glycerophosphate | 2.8007 to 3.4231 |
| Magnesium gluconate | 1.8886 to 2.3083 |
| L-glutamine | 1.4374 to 1.7568 |
| L-lysine acetate | 1.0375 to 1.2681 |
| L-leucine | 0.9471 to 1.1576 |
| L-arginine acetate | 0.9289 to 1.1354 |
| Potassium Chloride | 0.7879 to 0.9630 |
| L-valine | 0.7800 to 0.9533 |
| Citric acid | 0.7428 to 0.9079 |
| L-isoleucine | 0.6797 to 0.8307 |
| L-aspartic acid | 0.6574 to 0.8035 |
| L-alanine | 0.6351 to 0.7763 |
| L-phenylalanine | 0.6128 to 0.7490 |
| L-serine | 0.6017 to 0.7354 |
| Polyglycerol ester | 0.5669 to 0.6929 |
| L-proline | 0.5571 to 0.6809 |
| L-threonine | 0.5348 to 0.6537 |
| L-tyrosine | 0.4457 to 0.5448 |
| L-glutamic acid | 0.4234 to 0.5175 |
| Potassium citrate | 0.3580 to 0.4376 |
| Glycine | 0.3566 to 0.4358 |
| L-histadine hydrochloride | 0.3463 to 0.4233 |
| L-methionine | 0.3454 to 0.4222 |
| Sodium citrate | 0.2764 to 0.3378 |
| L-cystine | 0.2563 to 0.3132 |
| Choline bitartrate | 0.2386 to 0.2916 |
| L-tryptophan | 0.1894 to 0.2315 |
| Sodium Phosphate dibasic | 0.1818 to 0.2223 |
| Potassium sorbate | 0.1746 to 0.2134 |
| Ascorbic acid | 0.0938 to 0.1146 |
| Alpha tocopheryl acetate | 0.0836 to 0.1021 |
| Beta carotene | 0.0487 to 0.0595 |
| Taurine | 0.0415 to 0.0507 |
| M-inositol | 0.0338 to 0.0413 |
| Zinc sulfate | 0.0178 to 0.0218 |
| Ferrous sulfate | 0.0165 to 0.0201 |
| Niacinamide | 0.0133 to 0.0162 |
| L-carnitine | 0.0130 to 0.0158 |
| Biotin | 0.0065 to 0.0079 |
| Copper gluconate | 0.0047 to 0.0057 |
| Calcium pantothenate | 0.0037 to 0.0046 |
| Vitamin A palmitate | 0.0037 to 0.0045 |
| Manganese sulfate | 0.0033 to 0.0041 |
| Vitamin $D_3$ | 0.0032 to 0.0040 |
| Vitamin $K_1$ | 0.0025 to 0.0031 |

-continued

| Ingredient | % by weight |
| --- | --- |
| Cyanocobalamin | 0.0020 to 0.0025 |
| Potassium Iodide | 0.0018 to 0.0021 |
| Pyridoxine hydrochloride | 0.0016 to 0.0020 |
| Folic acid | 0.0013 to 0.0016 |
| Riboflavin | 0.0012 to 0.0015 |
| Thiamine hydrochloride | 0.0010 to 0.0013 |
| Chromic acetate monohydrate | 0.00010 to 0.00011 |
| Sodium molybdate | 0.00010 to 0.00011 |
| Sodium selenite anhydrous | 0.000040 to 0.000044 |
| Total | 100 |

The most preferred composition comprises, based on total dry weight of the compositions:

| | |
| --- | --- |
| Maltodextrin | 47.3289 |
| Modified starch | 18.1728 |
| Medium chain triglycerides | 8.4189 |
| Soybean oil | 3.6482 |
| Calcium glycerophosphate | 3.1119 |
| Magnesium gluconate | 2.0985 |
| L-glutamine | 1.5971 |
| L-lysine acetate | 1.1528 |
| L-leucine | 1.0524 |
| L-arginine acetate | 1.0321 |
| Potassium Chloride | 0.8755 |
| L-valine | 0.8667 |
| Citric acid | 0.8254 |
| L-isoleucine | 0.7552 |
| L-aspartic acid | 0.7305 |
| L-alanine | 0.7057 |
| L-phenylalanine | 0.6809 |
| L-serine | 0.6686 |
| Polyglycerol ester | 0.6299 |
| L-proline | 0.6190 |
| L-threonine | 0.5943 |
| L-tyrosine | 0.4952 |
| L-glutamic acid | 0.4705 |
| Potassium citrate | 0.3978 |
| Glycine | 0.3962 |
| L-histidine hydrochloride | 0.3848 |
| L-methionine | 0.3838 |
| Sodium citrate | 0.3071 |
| L-cystine | 0.2848 |
| Choline bitartrate | 0.2651 |
| L-tryptophan | 0.2105 |
| Sodium Phosphate dibasic | 0.2021 |
| Potassium sorbate | 0.1940 |
| Ascorbic acid | 0.1042 |
| Alpha tocopheryl acetate | 0.0929 |
| Beta carotene | 0.0541 |
| Taurine | 0.0461 |
| M-inositol | 0.0375 |
| Zinc sulfate | 0.0198 |
| Ferrous sulfate | 0.0183 |
| Niacinamide | 0.0147 |
| t-carnitine | 0.0144 |
| Biotin | 0.0072 |
| Copper gluconate | 0.0052 |
| Calcium pantothenate | 0.0042 |
| Vitamin A palmitate | 0.0041 |
| Manganese sulfate | 0.0037 |
| Vitamin $D_3$ | 0.0036 |
| Vitamin $K_1$ | 0.0028 |
| Cyanocobalamin | 0.0023 |
| Potassium Iodide | 0.0019 |
| Pyridoxine hydrochloride | 0.0018 |
| Folic acid | 0.0014 |
| Riboflavin | 0.0013 |
| Thiamine hydrochloride | 0.0012 |
| Chromic acetate monohydrate | 0.0001 |
| Sodium molybdate | 0.0001 |
| Sodium selenite anhydrous | 0.00004 |
| Total | 100 |

The enteral nutritional compositions of this invention may be administered via a nasogastric, nasointestinal, esophagostomy, gastrostomy, or jejunostomy feeding tube. Because of its homogeneity and low viscosity, small bore feeding tubes (16 gauge catheter or #5 French tube) may be used to optimize patient tolerance. The diet should be given at room temperature by continuous drip technique, or using a suitable infusion pump. At the 0.8 calorie per ml dilution, the composition supplies most of the daily fluid requirement. Additional fluids should be given when necessary to maintain hydration and adequate urine output.

The compositions can also be administered orally, such as a flavored drink served chilled over ice. The compositions of the invention are useful for administering complete nutrition or nutritional supplement to adolescents preferably ages 1 to 18 years, more preferably ages 1 to 10 years, most preferably ages 1 to 6 years. The compositions provide at least 800 calories per day. The compositions are particularly useful for administering to an adolescent for diseases or conditions such as inflammatory bowel disease, intractable diarrhea, lactose intolerance, short bowel syndrome, cystic fibrosis, cow's milk protein enteropathy or sensitivity, pre or post surgery, trauma, AIDS, malabsorption syndrome, gastroenteritis, GI fistula, and pancreatic disorder.

The following examples are presented to help demonstrate this invention. The examples are intended to be illustrative and not limitative.

EXAMPLE 1

A dietary composition (sample #8773) having an amino acid profile within the scope of the present invention was compared to a dietary composition containing casein as the standard protein source. These compositions had the following formulations:

| | Amount (wt. %) | |
| --- | --- | --- |
| Ingredients | Sample #8773 | Casein Composition |
| Casein | — | 11.14 |
| Amino Acid Mix* | 11.70 | — |
| Cottonseed Oil | 8.00 | 7.96 |
| Vitamin Mix | 1.00 | 1.00 |
| Salt Mixture | 5.00 | 4.81 |
| Non-nutritive fiber | 1.00 | 1.00 |
| Corn starch | 34.15 | 34.15 |
| Sucrose | 34.15 | 35.59 |
| Water | 5.00 | 4.35 |

*Amino acid mix comprises:

| Ingredient | % by weight |
| --- | --- |
| L-glutamine | 12.2 |
| L-leucine | 8.0 |
| L-arginine acetate | 7.9 |
| L-lysine acetate | 8.8 |
| L-isoleucine | 5.8 |
| L-valine | 6.6 |
| L-phenylalanine | 5.2 |
| L-methionine | 2.9 |
| L-threonine | 4.5 |
| L-tyrosine | 3.8 |
| L-histidine hydrochloride | 2.9 |
| L-aspartic acid | 5.6 |
| L-proline | 4.7 |
| L-tryptophan | 1.6 |
| L-serine | 5.1 |
| L-alanine | 5.4 |
| glycine | 3.0 |
| L-glutamic acid | 3.6 |
| L-cystine | 2.2 |

The compositions were compared for Protein Efficiency Ratio (PER) which is a measure of protein quality using laboratory rats. PER is determined by dividing the animal's weight gain by protein intake. Two groups of ten rats each were fed a diet, for 28 days, of Sample #8773 and the casein composition, respectively. Every seven days the rats were weighed and their food consumption was recorded. At the end of 28 days, the total weight gain and protein consumption of the two groups were calculated. These values were used to calculate the PER.

The results for the casein composition are presented in Table 1 and in Table 2 for Sample #8773 of the invention.

TABLE 1

(Casein Composition)

| ANIMAL NUMBER | BODY WEIGHTS - GMS | | | | | WT. GAIN |
|---|---|---|---|---|---|---|
| | 0 | 1 | 2 | 3 | 4 | |
| 1 | 65 | 82 | 106 | 129 | 162 | 97 |
| 2 | 64 | 84 | 106 | 129 | 156 | 92 |
| 3 | 61 | 81 | 104 | 129 | 164 | 103 |
| 4 | 62 | 78 | 99 | 119 | 155 | 93 |
| 5 | 65 | 89 | 119 | 144 | 183 | 118 |
| 6 | 61 | 80 | 111 | 139 | 167 | 106 |
| 7 | 62 | 80 | 102 | 129 | 158 | 96 |
| 8 | 63 | 87 | 113 | 135 | 173 | 110 |
| 9 | 66 | 87 | 115 | 142 | 179 | 113 |
| 10 | 64 | 91 | 124 | 152 | 189 | 125 |
| MEAN | 63 | 84 | 110 | 135 | 169 | 105 |
| SD | 1.77 | 4.38 | 7.92 | 9.63 | 11.90 | 11.16 |

| ANIMAL NUMBER | FEED CONSUMPTION - GMS | | | | | PRO-TEIN | PER* |
|---|---|---|---|---|---|---|---|
| | 1 | 2 | 3 | 4 | TOTAL | | |
| 1 | 69 | 97 | 96 | 98 | 360 | 36.0 | 2.69 |
| 2 | 75 | 88 | 96 | 95 | 354 | 35.4 | 2.60 |
| 3 | 69 | 86 | 89 | 103 | 347 | 34.7 | 2.97 |
| 4 | 72 | 81 | 87 | 114 | 354 | 35.4 | 2.63 |
| 5 | 81 | 101 | 109 | 121 | 412 | 41.2 | 2.86 |
| 6 | 73 | 96 | 109 | 106 | 384 | 38.4 | 2.76 |
| 7 | 74 | 84 | 101 | 112 | 371 | 37.1 | 2.59 |
| 8 | 80 | 89 | 94 | 116 | 379 | 37.9 | 2.90 |
| 9 | 78 | 98 | 102 | 120 | 398 | 39.8 | 2.84 |
| 10 | 85 | 107 | 113 | 129 | 434 | 43.4 | 2.88 |
| MEAN | 76 | 93 | 100 | 111 | 379 | 37.9 | 2.77 |
| SD | 5.30 | 8.33 | 8.77 | 10.81 | 28.28 | 2.83 | .138 |

*PER = Protein Efficiency Ratio

TABLE 2

(SAMPLE #8773)

| ANIMAL NUMBER | BODY WEIGHTS - GMS | | | | | WT. GAIN |
|---|---|---|---|---|---|---|
| | 0 | 1 | 2 | 3 | 4 | |
| 1 | 64 | 105 | 163 | 216 | 272 | 208 |
| 2 | 65 | 93 | 138 | 182 | 225 | 160 |
| 3 | 63 | 91 | 133 | 179 | 231 | 168 |
| 4 | 62 | 94 | 150 | 198 | 250 | 188 |
| 5 | 60 | 86 | 128 | 164 | 202 | 142 |
| 6 | 62 | 86 | 130 | 175 | 218 | 156 |
| 7 | 61 | 87 | 129 | 177 | 222 | 161 |
| 8 | 62 | 86 | 129 | 172 | 211 | 149 |
| 9 | 60 | 89 | 139 | 190 | 241 | 181 |
| 10 | 61 | 85 | 125 | 171 | 214 | 153 |
| MEAN | 62 | 90 | 136 | 182 | 229 | 167 |
| SD | 1.63 | 6.09 | 11.85 | 15.28 | 20.82 | 20.19 |

TABLE 2-continued (SAMPLE #8773)

| ANIMAL NUMBER | FEED CONSUMPTION - GMS | | | | | PRO-TEIN | PER* |
|---|---|---|---|---|---|---|---|
| | 1 | 2 | 3 | 4 | TOTAL | | |
| 1 | 94 | 133 | 148 | 153 | 528 | 52.8 | 3.94 |
| 2 | 82 | 120 | 138 | 141 | 481 | 48.1 | 3.33 |
| 3 | 74 | 113 | 136 | 145 | 468 | 46.8 | 3.59 |
| 4 | 82 | 133 | 139 | 146 | 500 | 50.0 | 3.76 |
| 5 | 70 | 110 | 119 | 119 | 418 | 41.8 | 3.40 |
| 6 | 77 | 114 | 134 | 136 | 461 | 46.1 | 3.38 |
| 7 | 80 | 107 | 130 | 132 | 449 | 44.9 | 3.59 |
| 8 | 79 | 110 | 124 | 125 | 438 | 43.8 | 3.40 |
| 9 | 89 | 132 | 153 | 150' | 524 | 52.4 | 3.45 |
| 10 | 74 | 105 | 126 | 128 | 433 | 43.3 | 3.53 |
| MEAN | 80 | 118 | 135 | 138 | 470 | 47.0 | 3.54 |
| SD | 7.20 | 11.10 | 10.55 | 11.35 | 37.89 | 3.79 | .191 |

The results show that compositions having the amino acid profile of this invention have a significantly greater protein efficiency ratio than the conventional casein protein.

EXAMPLE 2

A dietary composition within the scope of this invention, (Sample A) was prepared and compared to a dietary composition described in U.S. Pat. No. 4,368,204 (Sample B).

Sample A of this invention had the following composition:

| Ingredient | % by weight |
|---|---|
| Maltodextrin | 47.3289 |
| Modified starch | 18.1728 |
| Medium chain triglycerides (MCT) | 8.4189 |
| Soybean oil | 3.6482 |
| Calcium glycerophosphate | 3.1119 |
| Magnesium gluconate | 2.0985 |
| L-glutamine | 1.5971 |
| L-lysine acetate | 1.1528 |
| L-leucine | 1.0524 |
| L-arginine acetate | 1.0321 |
| Potassium Chloride | 0.8755 |
| L-valine | 0.8667 |
| Citric acid | 0.8254 |
| L-isoleucine | 0.7552 |
| L-aspartic acid | 0.7305 |
| L-alanine | 0.7057 |
| L-phenylalanine | 0.6809 |
| L-serine | 0.6686 |
| Polyglycerol ester | 0.6299 |
| L-proline | 0.6190 |
| L-threonine | 0.5943 |
| L-tyrosine | 0.4952 |
| L-glutamic acid | 0.4705 |
| Potassium citrate | 0.3978 |
| Glycine | 0.3962 |
| L-histidine hydrochloride | 0.3848 |
| L-methionine | 0.3838 |
| Sodium citrate | 0.3071 |
| L-cystine | 0.2848 |
| Choline bitartrate | 0.2651 |
| L-tryptophan | 0.2105 |
| Sodium Phosphate dibasic | 0.2021 |
| Potassium sorbate | 0.1940 |
| Ascorbic acid | 0.1042 |
| Alpha tocopheryl acetate | 0.0929 |
| Beta carotene | 0.0541 |
| Taurine | 0.0461 |
| M-inositol | 0.0375 |
| Zinc sulfate | 0.0198 |

-continued

| Ingredient | % by weight |
|---|---|
| Ferrous sulfate | 0.0183 |
| Niacinamide | 0.0147 |
| L-carnitine | 0.0144 |
| Biotin | 0.0072 |
| Copper gluconate | 0.0052 |
| Calcium pantothenate | 0.0042 |
| Vitamin A palmitate | 0.0041 |
| Manganese sulfate | 0.0037 |
| Vitamin $D_3$ | 0.0036 |
| Vitamin $K_1$ | 0.0028 |
| Cyanocobalamin | 0.0023 |
| Potassium Iodide | 0.0019 |
| Pyridoxine hydrochloride | 0.0018 |
| Folic acid | 0.0014 |
| Riboflavin | 0.0013 |
| Thiamine hydrochloride | 0.0012 |
| Chromic acetate monohydrate | 0.0001 |
| Sodium molybdate | 0.0001 |
| Sodium selenite anhydrous | 0.00004 |
| Total | 100 |

The caloric content of Sample A was 12% amino acid 25% lipid and 63% carbohydrate.

Comparative Sample B had the following composition:

| Ingredient | % by wt. |
|---|---|
| Dextrin | 82.40478 |
| soybean oil | 3.14522 |
| L-leucine | 1.31575 |
| L-proline | 1.27906 |
| L-alanine | 1.25809 |
| L-lysine monohydrochloride | 1.24367 |
| L-serine | 1.15718 |
| L-glutamic acid | 0.97895 |
| L-arginine | 0.90818 |
| N-acetyl-L-tyrosine | 0.70505 |
| L-valine | 0.70374 |
| L-isoleucine | 0.68015 |
| L-threonine | 0.65001 |
| L-histidine hydrochloride | 0.49799 |
| L-cystine hydrochloride monohydrate | 0.41019 |
| L-phenylalanine | 0.40626 |
| di-L-aspartic acid monomagnesium | 0.35842 |
| L-aspartic acid monopotassium | 0.35842 |
| glycine | 0.29749 |
| Zinc sulfate heptahydrate | 0.28137 |
| L-tryptophan | 0.24375 |
| L-methionine | 0.20837 |
| potassium sorbate | 0.15726 |
| polysorbate 80 | 0.15412 |
| ferrous gluconate | 0.05762 |
| choline bitatrate | 0.03916 |
| ascorbic acid | 0.03748 |
| soy lecithin | 0.02202 |
| vitamin K | 0.01922 |
| cupric sulfate pentahydrate | 0.00180 |
| tocopherol acetate | 0.00722 |
| Niacinamide | 0.00481 |
| Manganese sulfate pentahydrate | 0.00285 |
| Calcium pantothenate | 0.00260 |
| pyridoxine hydrochloride | 0.00058 |
| retinol acetate | 0.00049 |
| thiamine hydrochloride | 0.00042 |
| folic acid | 0.00010 |
| biotin | 0.00009 |
| riboflavine sodium phosphate | 0.00006 |
| ergocalciferol, $D_2$ | 0.00001 |
| cyanocobalamin | 0.000001 |
| Total | 100 |

The caloric content of Sample B was approximately 13% protein, 8% lipid and 79% carbohydrate.

Approximately 60–80 grams of Sample A and B, respectively, were dissolved in warm water to give 300 ml of solution. These solutions were prepared and visually evaluated by five individuals for instancy and solubility using a 5-point scale with 1=poor and 5=excellent. Instancy is defined as the amount of time with which the composition goes into solution and solubility is defined as quantity of insoluble particulates floating on the surface after the majority of the composition has gone into solution. The compositions were also visually evaluated for foaming, on the surface of the solution. The results of these evaluations are presented in Table 3.

TABLE 3

|  | Sample A | Sample B |
|---|---|---|
|  | (average rating) | |
| Instancy | 3.2 | 1.4 |
| Solubility | 2.6 | 1.8 |
| Foaming | none | 4 millimeters |

Comparative Sample B exhibited lumps of product floating on the surface after mixing and there were no lumps of product floating on the surface for Sample A of the invention. Comparative Sample B had a white particulate layer form on the bottom of the solution after sitting approximately 5 minutes whereas Sample A had no such sediment.

EXAMPLE 3

The composition of this invention, (Sample A) and the comparative composition (Sample B) prepared in Example 2 were rated for protein quality according to the Food and Agriculture Organization of the United Nations/World Health Organization, joint FAO/WHO Expert Consultation on Protein Quality Evaluation (1989), which is herein incorporated by reference. The compositions were given a score in comparison to egg having a score of 100 as the reference protein. The results of this scoring are presented in Table 4.

TABLE 4

| | | Sample A | | Sample B | |
|---|---|---|---|---|---|
| Amino acid | Reference Protein (Egg) (mg/g) | Amino Acid value (mg/g) | % of Reference Protein | Amino Acid value (mg/g) | % of Ref. Protein |
| L-Histidine | 22 | 23 | 105 | 24.3 | 110 |
| L-Isoleucine | 54 | 61 | 113 | 45 | 83 |
| L-Leucine | 86 | 85 | 99 | 87 | 101 |
| L-Lysine | 70 | 66 | 94 | 65.8 | 94 |
| L-Methionine + L-cystine | 57 | 54 | 95 | 32.5 | 57 |
| L-Phenylalanine + L-tyrosine | 93 | 95 | 102 | 64.8 | 70 |
| L-Threonine | 47 | 48 | 102 | 43 | 91 |
| L-Tryptophan | 17 | 17 | 100 | 16.2 | 95 |
| L-Valine | 66 | 70 | 106 | 46.5 | 70 |
| Chemical Score | 100 | | 94 | | 57 |

This scoring shows that the amino acid component of the composition of the present invention is of higher quality than that of the comparative prior art composition. The scoring means that there is a limiting amino acid in the composition of this invention which is 94% of the egg reference protein, whereas the limiting amino acid of the comparative composition is only 57% of the egg reference protein.

We claim:

1. A method of providing nutrition to a human adolescent which comprises orally or enterally administering to said adolescent a dietary composition which comprises:

a) a carbohydrate component selected from the group consisting of maltodextrin, modified starch, and mixtures thereof, which comprises from 50 to 65% of the total caloric content of said composition;

b) a lipid component selected from the group consisting of soybean oil, medium chain triglycerides, and mixtures thereof, which comprises 20 to 35% of the total caloric content of said composition; and c) an amino acid component which comprises from 10 to 20% of the total caloric content of said composition and which comprises 2.3 to 2.8% L-histidine, 6.1 to 7.4% L-isoleucine, 8.5 to 10.2% L-leucine, 7.0 to 8.4% L-valine, 6.6 to 8.0% L-lysine, 3.1 to 3.8% L-methionine, 5.5 to 6.6% L-phenylalanine, 4.8 to 5.8% L-threonine, 1.7 to 2.1% L-tryptophan, 5.7 to 6.9% L-alanine, 6.2 to 7.5% L-arginine, 5.9 to 7.1% L-aspartic acid, 2.3 to 2.8% L-cystine, 12.9 to 15.5% L-glutamine, 3.8 to 4.6% L-glutamic acid, 3.2 to 3.9% glycine, 5.0 to 6.0% L-proline, 5.4 to 6.5% L-serine, and 4.0 to 4.8% L-tyrosine, all abased on total weight of said amino acid component.

2. The method of claim 1 wherein said carbohydrate component comprises about 63%, said lipid component comprises about 25% and said amino acid component comprises about 12% based on total caloric content of said composition.

3. The method of claim 1 wherein said amino acid component comprises about 2.5% L-histidine, 6.7% L-isoleucine, 9.4 L-leucine, 7.7% L-valine, 7.3% L-lysine, 3.4% L-methionine, 6.1% L-phenylalanine, 5.3% L-threonine, 1.9% L-tryptophan, 6.3% L-alanine, 6.8% L-arginine, 6.5% L-aspartic acid, 2.5% L-cystine, 14.2% L-glutamine, 4.2% L-glutamic acid, 3.5% glycine, 5.5% L-proline, 5.9% L-serine and 4.4 L-tyrosine based on total weight of said amino acid component.

4. The method of claim 1 wherein said lipid component consists of about 30% by weight soybean oil and about 70% by weight medium chain, triglycerides based on total weight of said lipid component.

5. The method of claim 1 wherein said composition is dissolved or dispersed in a non-protein aqueous-based medium.

6. The method of claim 5 wherein said composition has a caloric density of about 0.8 calories/ml.

7. The method of claim 5 wherein said composition has an osmolality of 300 to 400 mOsm/kg water.

8. The method of claim 1 wherein said adolescent is age 1 to 18 years.

9. The method of claim 1 wherein said adolescent is age 1 to 10 years.

10. The method of claim 1 wherein said composition is administered orally.

11. The method of claim 1 wherein said composition is administered enterally.

12. The method of claim 1 wherein said composition provides at least 800 calories per day.

13. The method of claim 1 wherein said composition comprises based on total dry weight of said composition:

| Ingredient | % by weight | | |
|---|---|---|---|
| Maltodextrin | 42.5960 | to | 52.0618 |
| Modified starch | 16.3556 | to | 19.9901 |
| Med. chain triglycerides | 7.5770 | to | 9.2608 |
| Soybean oil | 3.2834 | to | 4.0130 |
| Calcium glycero-phosphate | 2.8007 | to | 3.4231 |
| Magnesium gluconate | 1.8886 | to | 2.3083 |
| L-glutamine | 1.4374 | to | 1.7568 |
| L-lysine acetate | 1.0375 | to | 1.2681 |
| L-leucine | 0.9471 | to | 1.1576 |
| L-arginine acetate | 0.9289 | to | 1.1354 |
| Potassium chloride | 0.7879 | to | 0.9630 |
| L-valine | 0.7800 | to | 0.9533 |
| Citric acid | 0.7428 | to | 0.9079 |
| L-isoleucine | 0.6797 | to | 0.8307 |
| L-aspartic acid | 0.6574 | to | 0.8035 |
| L-alanine | 0.6351 | to | 0.7763 |
| L-phenylalanine | 0.6128 | to | 0.7490 |
| L-serine | 0.6017 | to | 0.7354 |
| Polyglycerol ester | 0.5669 | to | 0.6929 |
| L-proline | 0.5571 | to | 0.6809 |
| L-threonine | 0.5348 | to | 0.6537 |
| L-tyrosine | 0.4457 | to | 0.5448 |
| L-glutamic acid | 0.4234 | to | 0.5175 |
| Potassium citrate | 0.3580 | to | 0.4376 |
| Glycine | 0.3566 | to | 0.4358 |
| L-histidine hydrochloride | 0.3463 | to | 0.4233 |
| L-methionine | 0.3454 | to | 0.4222 |
| Sodium citrate | 0.2764 | to | 0.3378 |
| L-cystine | 0.2563 | to | 0.3132 |
| Choline bitartrate | 0.2386 | to | 0.2916 |
| L-tryptophan | 0.1894 | to | 0.2315 |
| Sodium Phosphate dibasic | 0.1818 | to | 0.2223 |
| Potassium sorbate | 0.1746 | to | 0.2134 |
| Ascorbic acid | 0.0938 | to | 0.1146 |
| Alpha tocopheryl acetate | 0.0836 | to | 0.1021 |
| Beta carotene | 0.0487 | to | 0.0595 |
| Taurine | 0.0415 | to | 0.0507 |
| M-inositol | 0.0338 | to | 0.0413 |
| Zinc sulfate | 0.0178 | to | 0.0218 |
| Ferrous sulfate | 0.0165 | to | 0.0201 |
| Niacinamide | 0.0133 | to | 0.0162 |
| L-carnitine | 0.0130 | to | 0.0158 |
| Biotin | 0.0065 | to | 0.0079 |
| Copper gluconate | 0.0047 | to | 0.0057 |
| Calcium pantothenate | 0.0037 | to | 0.0046 |
| Vitamin A palmitate | 0.0037 | to | 0.0045 |
| Manganese sulfate | 0.0033 | to | 0.0041 |
| Vitamin $D_3$ | 0.0032 | to | 0.0040 |
| Vitamin $K_1$ | 0.0025 | to | 0.0031 |
| Cyanocobalamin | 0.0020 | to | 0.0025 |
| Potassium Iodide | 0.0018 | to | 0.0021 |
| Pyridoxine hydrochloride | 0.0016 | to | 0.0020 |
| Folic acid | 0.0013 | to | 0.0016 |
| Riboflavin | 0.0012 | to | 0.0015 |
| Thiamine hydrochloride | 0.0010 | to | 0.0013 |
| Chromic acetate monohydrate | 0.00010 | to | 0.00011 |
| Sodium molybdate | 0.00010 | to | 0.00011 |
| Sodium selenite anhydrous | 0.000040 | to | 0.000044 |
| Total | | 100 | |

14. The method of claim 1 wherein said composition comprises based on total dry weight of said composition:

| Ingredient | % by weight |
|---|---|
| Maltodextrin | 47.3289 |
| Modified starch | 18.1728 |
| Medium chain triglycerides | 8.4189 |
| Soybean oil | 3.6482 |
| Calcium glycerophosphate | 3.1119 |

| Ingredient | % by weight |
| --- | --- |
| Magnesium gluconate | 2.0985 |
| L-glutamine | 1.5971 |
| L-lysine acetate | 1.1528 |
| L-leucine | 1.0524 |
| L-arginine acetate | 1.0321 |
| Potassium Chloride | 0.8755 |
| L-valine | 0.8667 |
| Citric acid | 0.8254 |
| L-isoleucine | 0.7552 |
| L-aspartic acid | 0.7305 |
| L-alanine | 0.7057 |
| L-phenylalanine | 0.6809 |
| L-serine | 0.6686 |
| Polyglycerol ester | 0.6299 |
| L-proline | 0.6190 |
| L-threonine | 0.5943 |
| L-tyrosine | 0.4952 |
| L-glutamic acid | 0.4705 |
| Potassium citrate | 0.3978 |
| Glycine | 0.3962 |
| L-histidine hydrochloride | 0.3848 |
| L-methionine | 0.3838 |
| Sodium citrate | 0.3071 |
| L-cystine | 0.2848 |
| Choline bitartrate | 0.2651 |
| L-tryptophan | 0.2105 |
| Sodium Phosphate dibasic | 0.2021 |
| Potassium sorbate | 0.1940 |
| Ascorbic acid | 0.1042 |
| Alpha tocopheryl acetate | 0.0929 |
| Beta carotene | 0.0541 |
| Taurine | 0.0461 |
| M-inositol | 0.0375 |
| Zinc sulfate | 0.0198 |
| Ferrous sulfate | 0.0183 |
| Niacinamide | 0.0147 |
| L-carnitine | 0.0144 |
| Biotin | 0.0072 |
| Copper gluconate | 0.0052 |
| Calcium pantothenate | 0.0042 |
| Vitamin A palmitate | 0.0041 |
| Manganese sulfate | 0.0037 |
| Vitamin $D_3$ | 0.0036 |
| Vitamin $K_1$ | 0.0028 |
| Cyanocobalamin | 0.0023 |
| Potassium Iodide | 0.0019 |
| Pyridoxine hydrochloride | 0.0018 |
| Folic acid | 0.0014 |
| Riboflavin | 0.0013 |
| Thiamine hydrochloride | 0.0012 |
| Chromic acetate monohydrate | 0.0001 |
| Sodium molybdate | 0.0001 |
| Sodium selenite anhydrous | 0.00004 |
| Total | 100 |

\* \* \* \* \*